(12) United States Patent
Gillette et al.

(10) Patent No.: US 11,175,057 B2
(45) Date of Patent: Nov. 16, 2021

(54) HVAC MULTI-ZONE MANAGEMENT SCREEN SYSTEMS AND METHODS

(71) Applicant: Johnson Controls Technology Company, Auburn Hills, MI (US)

(72) Inventors: Theresa N. Gillette, Wichita, KS (US); Shaun B. Atchison, Wichita, KS (US); John W. Uerkvitz, Valley Center, KS (US); Jonathan A. Burns, Wichita, KS (US); Brian D. Rigg, Douglass, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 42 days.

(21) Appl. No.: 16/204,893

(22) Filed: Nov. 29, 2018

(65) Prior Publication Data

US 2020/0166228 A1  May 28, 2020

Related U.S. Application Data

(60) Provisional application No. 62/771,997, filed on Nov. 27, 2018.

(51) Int. Cl.
*F24F 11/30* (2018.01)
*F24F 11/00* (2018.01)
*F24F 11/52* (2018.01)
*F24F 11/54* (2018.01)
*F24F 11/56* (2018.01)
(Continued)

(52) U.S. Cl.
CPC .......... *F24F 11/30* (2018.01); *F24F 11/0001* (2013.01); *F24F 11/52* (2018.01); *F24F 11/54* (2018.01); *F24F 11/56* (2018.01); *F24F 11/64* (2018.01); *F24F 11/65* (2018.01); *F24F 11/80* (2018.01); *G05B 15/02* (2013.01); *F24F 2110/10* (2018.01); *F24F 2120/20* (2018.01); *F24F 2140/50* (2018.01); *F24F 2221/10* (2013.01)

(58) Field of Classification Search
USPC ........................................................ 700/277
See application file for complete search history.

(56) References Cited

U.S. PATENT DOCUMENTS 8,224,491 B2   7/2012  Koster et al.
8,346,396 B2 *  1/2013  Amundson ............ G05B 13/02
                                                    700/276
(Continued)

*Primary Examiner* — Robert A Cassity
(74) *Attorney, Agent, or Firm* — Fletcher Yoder, P.C.

(57) ABSTRACT

In an embodiment of the present disclosure, a control system for a heating, ventilation, and/or air conditioning (HVAC) system includes a user interface configured to display a zone management screen having a first selectable representation of a first zone of the HVAC system including a first temperature set point and a first operating mode of the first zone, and a second selectable representation of a second zone of the HVAC system having a second temperature set point and a second operating mode of the second zone. The control system further includes a controller configured to receive a first input via the zone management screen to adjust the first temperature set point or to adjust the second temperature set point, and receive a second input via the zone management screen to adjust the first operating mode or to adjust the second operating mode.

26 Claims, 9 Drawing Sheets

(51) Int. Cl.
*F24F 11/64* (2018.01)
*F24F 11/80* (2018.01)
*G05B 15/02* (2006.01)
*F24F 11/65* (2018.01)
*F24F 110/10* (2018.01)
*F24F 120/20* (2018.01)
*F24F 140/50* (2018.01)

(56) References Cited

U.S. PATENT DOCUMENTS

| | | | |
|---|---|---|---|
| 8,387,892 B2 * | 3/2013 | Koster | G05D 23/1905 |
| | | | 236/94 |
| 9,176,491 B2 | 11/2015 | Dyess | |
| 9,599,361 B2 | 3/2017 | Honda | |
| 9,632,490 B2 | 4/2017 | Grohman et al. | |
| 9,939,824 B2 | 4/2018 | Nelson et al. | |
| 10,119,713 B2 | 11/2018 | Castillo et al. | |
| 2010/0070089 A1 * | 3/2010 | Harrod | F24F 11/30 |
| | | | 700/277 |
| 2012/0130513 A1 * | 5/2012 | Hao | G05B 15/02 |
| | | | 700/90 |
| 2012/0253521 A1 * | 10/2012 | Storm | G05B 15/02 |
| | | | 700/276 |
| 2014/0207291 A1 * | 7/2014 | Golden | G05D 23/1902 |
| | | | 700/277 |
| 2014/0316586 A1 * | 10/2014 | Boesveld | F24D 19/1066 |
| | | | 700/278 |
| 2015/0167995 A1 * | 6/2015 | Fadell | F24F 11/30 |
| | | | 700/275 |
| 2015/0261493 A1 * | 9/2015 | Lemmon | G06F 3/165 |
| | | | 715/716 |
| 2017/0139560 A1 | 5/2017 | Majewski et al. | |
| 2017/0234566 A1 * | 8/2017 | Gerszewski | G06F 21/604 |
| | | | 700/276 |
| 2018/0129232 A1 * | 5/2018 | Hriljac | F24F 11/56 |
| 2018/0364665 A1 * | 12/2018 | Clymer | H05B 47/19 |

* cited by examiner

HVAC MULTI-ZONE MANAGEMENT SCREEN SYSTEMS AND METHODS

CROSS REFERENCE TO RELATED APPLICATIONS

This application claims priority from and the benefit of U.S. Provisional Application Ser. No. 62/771,997, entitled "HVAC MULTI-ZONE MANAGEMENT SCREEN SYSTEMS AND METHODS," filed Nov. 27, 2018, which is hereby incorporated by reference in its entirety for all purposes.

BACKGROUND

The present disclosure relates generally to heating, ventilation, and/or air conditioning (HVAC) systems and, more particularly, to systems and methods for adjusting operating parameters of zones of an HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A wide range of applications exist for HVAC systems. For example, residential, light commercial, commercial, and industrial systems are used to control temperatures and air quality in residences and buildings. Such systems may be dedicated to either heating or cooling, although systems are common that perform both of these functions. Very generally, these systems operate by implementing a thermal cycle in which fluids are heated and cooled to provide a desired temperature in a controlled space, such as the inside of a residence or a building. Generally, HVAC systems may include a control device configured to control operational parameters of individual zones of the HVAC system.

SUMMARY

In one embodiment of the present disclosure, a control system for a heating, ventilation, and/or air conditioning (HVAC) system includes a user interface configured to display a zone management screen having a first selectable representation of a first zone of the HVAC system including a first temperature set point and a first operating mode of the first zone, and a second selectable representation of a second zone of the HVAC system having a second temperature set point and a second operating mode of the second zone. The control system further includes a controller configured to receive a first input via the zone management screen to adjust the first temperature set point of the first zone or to adjust the second temperature set point of the second zone, and receive a second input via the zone management screen to adjust the first operating mode of the first zone or to adjust the second operating mode of the second zone.

In another embodiment of the present disclosure, a controller for a heating, ventilation, and/or air conditioning (HVAC) system is configured to generate an interface screen for a display. The interface screen includes a first selectable representation of a first zone of the HVAC system, a second selectable representation of a second zone of the HVAC system, and a set point adjuster configured to selectively adjust a respective operating parameter set point for a selected one of the first zone or the second zone. The controller is further configured to receive a first set point adjustment input for the first zone via the set point adjuster of the interface screen, and receive a second set point adjustment input for the second zone via the set point adjuster of the interface screen.

In a further embodiment of the present disclosure, a non-transitory computer readable storage medium for a heating, ventilation, and/or air conditioning (HVAC) system includes instructions that, when executed by a processor, cause the processor to initiate displaying a zone management screen via a user interface. The zone management screen includes a plurality of selectable representations. Each selectable representation of the plurality of selectable representations is associated with one of a plurality of zones of the HVAC system, and each selectable representation of the plurality of selectable representations includes zone operating information for the respective zone. The instructions further cause the processor to initiate receiving an input of a selection of a zone of the plurality of zones via user selection of a selectable representation of the plurality of selectable representations of the zone management screen, and displaying the plurality of selectable representations while receiving an input to adjust a temperature set point of the zone via a set point adjuster of the zone management screen.

Other features and advantages of the present application will be apparent from the following, more detailed description of the embodiments, taken in conjunction with the accompanying drawings, which illustrate, by way of example, the principles of the application.

DRAWINGS

DETAILED DESCRIPTION

An HVAC system generally includes a control system to control and/or to coordinate operation of devices, such as equipment, machines, and sensors of the HVAC system. For example, the control system may communicate sensor data and control commands with devices of the HVAC system. In certain cases, the control system may adjust the operational parameters and/or properties of the HVAC system to control climate characteristics, such as an air flow, within different zones of a structure or other conditioned space. That is, operation of the HVAC system may be regulated to control an amount, direction, and/or temperature of air flow into different zones of the structure based on commands received from the control system. Moreover, the control system may control components of the HVAC system based on user input, which may be received through a user interface of a thermostat or other control device. Particularly, the user interface may provide options to adjust various operational parameters of the HVAC system to control the climate characteristics for one or more of the zones. However, to adjust the operational parameters for separate zones, a user may have to navigate through several sub-menus or screens for each zone. Further, in some instances, the user interface may be capable of receiving input to adjust the operation parameters for certain zones, such as a single zone in which the user interface is positioned, but not for other zones.

Accordingly, provided herein is an HVAC control system configured to enable user control of the operational parameters of multiple zones through a single zone management screen of a user interface. The user interface may be included in a thermostat or other user device, such as a laptop computer or smart phone. The zone management or "manage zones" screen includes selectable visual representations for multiple zones of an HVAC system. For example, each visual representation may include respective visual indications of a mode, a measured temperature, a set point temperature, and other operational parameters for a respective zone. A user may select one of the visual representations to change the operational parameters of the zone associated with the selected visual representation. The user may similarly select other visual representations displayed on the user interface or screen to change the operational parameters of the other zones associated with the other visual representations. In this way, a user may switch between the separate zones to adjust the operational parameters for each of the separate zones from the zone management screen without navigating through separate user interface sub-menus for each zone.

Figure 1:
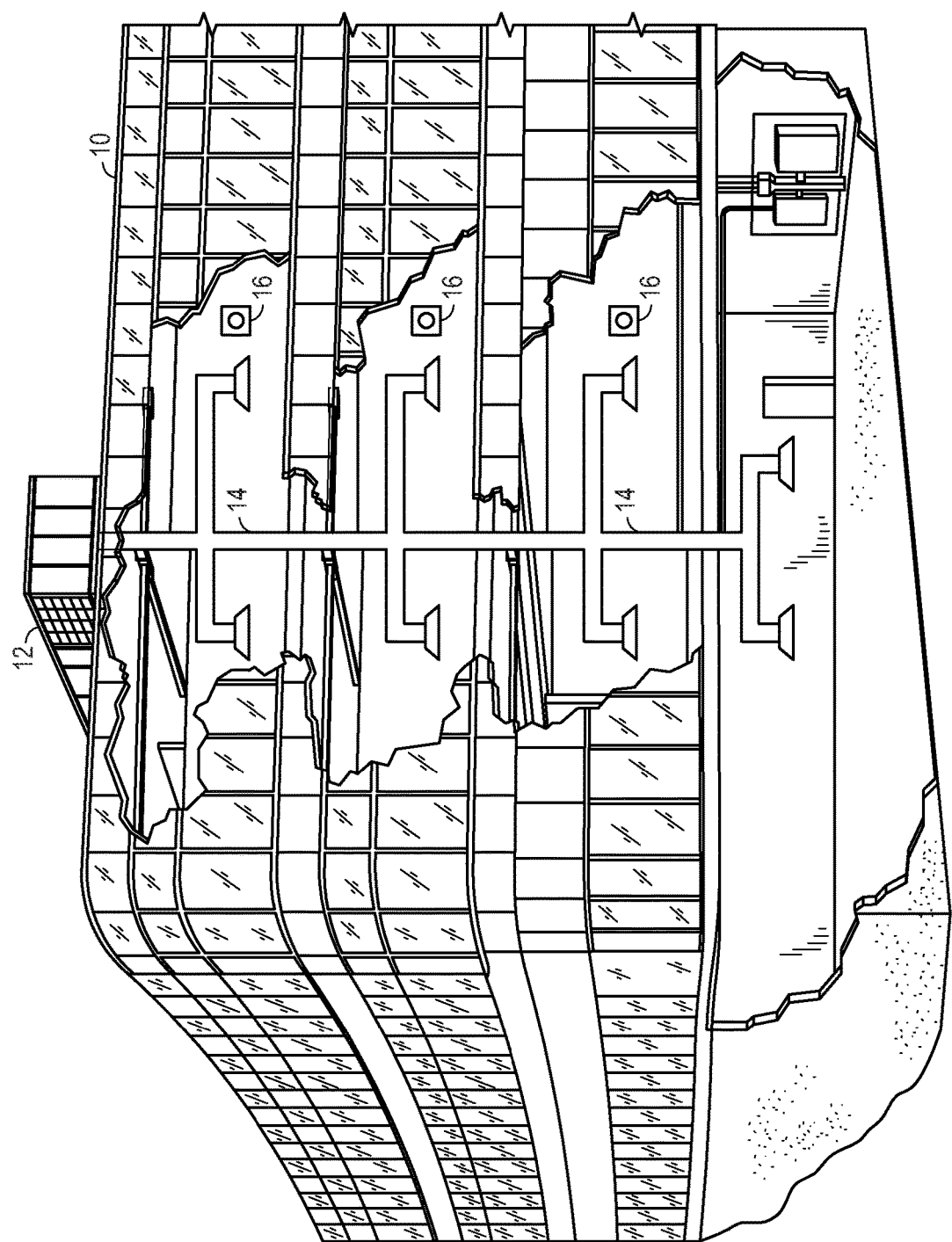
FIG. 1 is a perspective view of an embodiment of a heating, ventilation, and/or air conditioning (HVAC) system for building environmental management that may employ one or more HVAC units, in accordance with aspects of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56. The HVAC unit 12 is an air cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
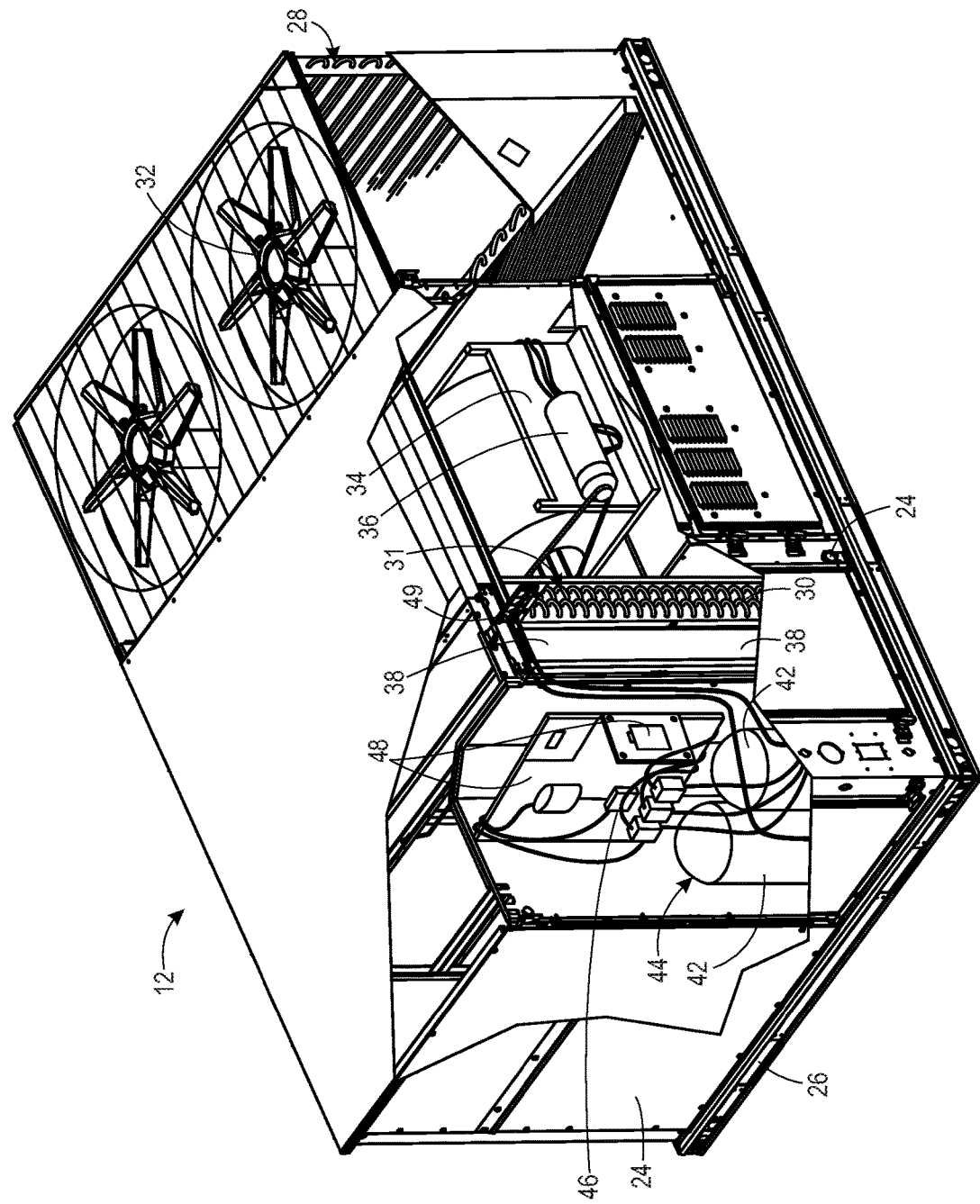
FIG. 2 is a perspective view of an embodiment of a packaged HVAC unit, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the airflows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
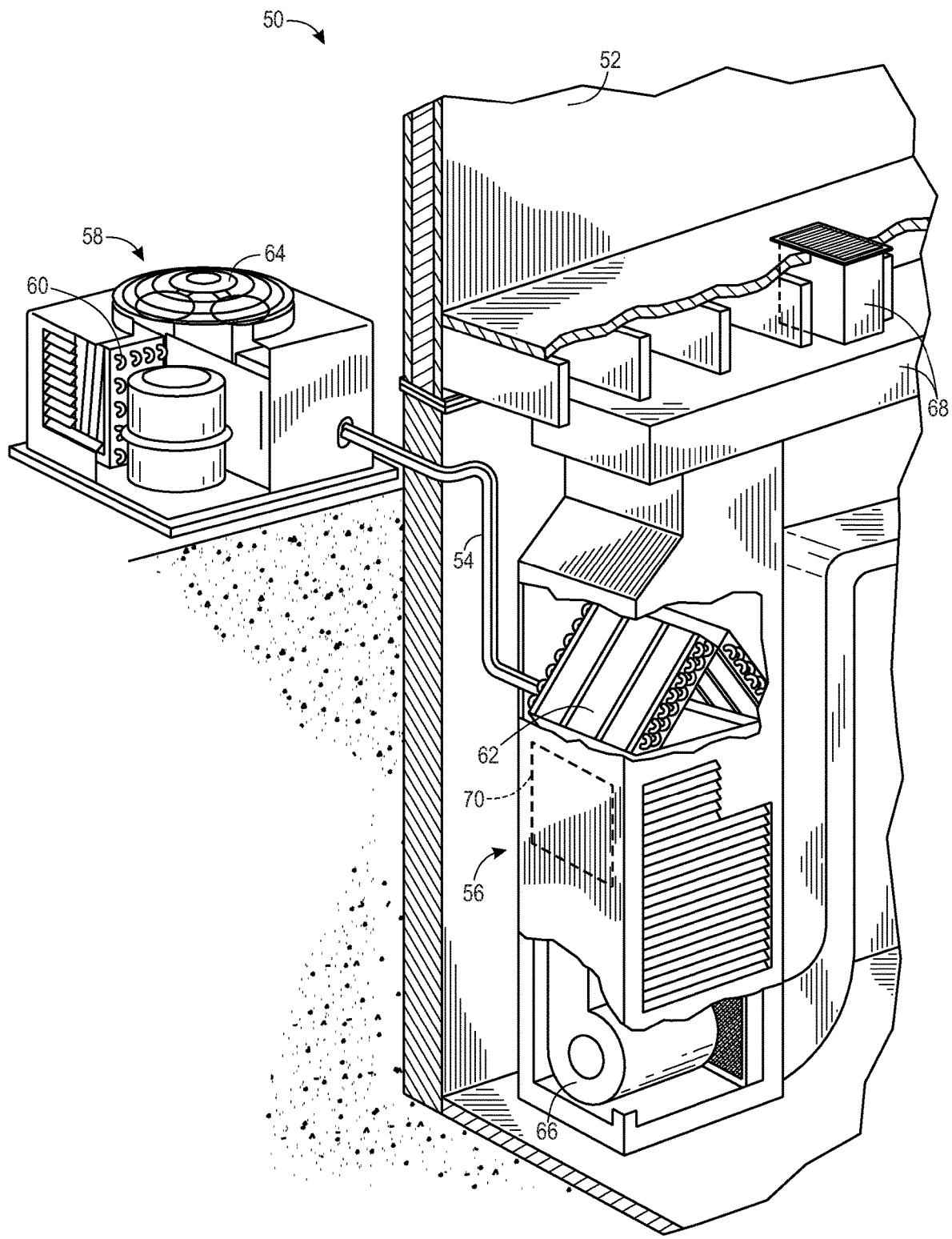
FIG. 3 is a perspective view of an embodiment of a residential, split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
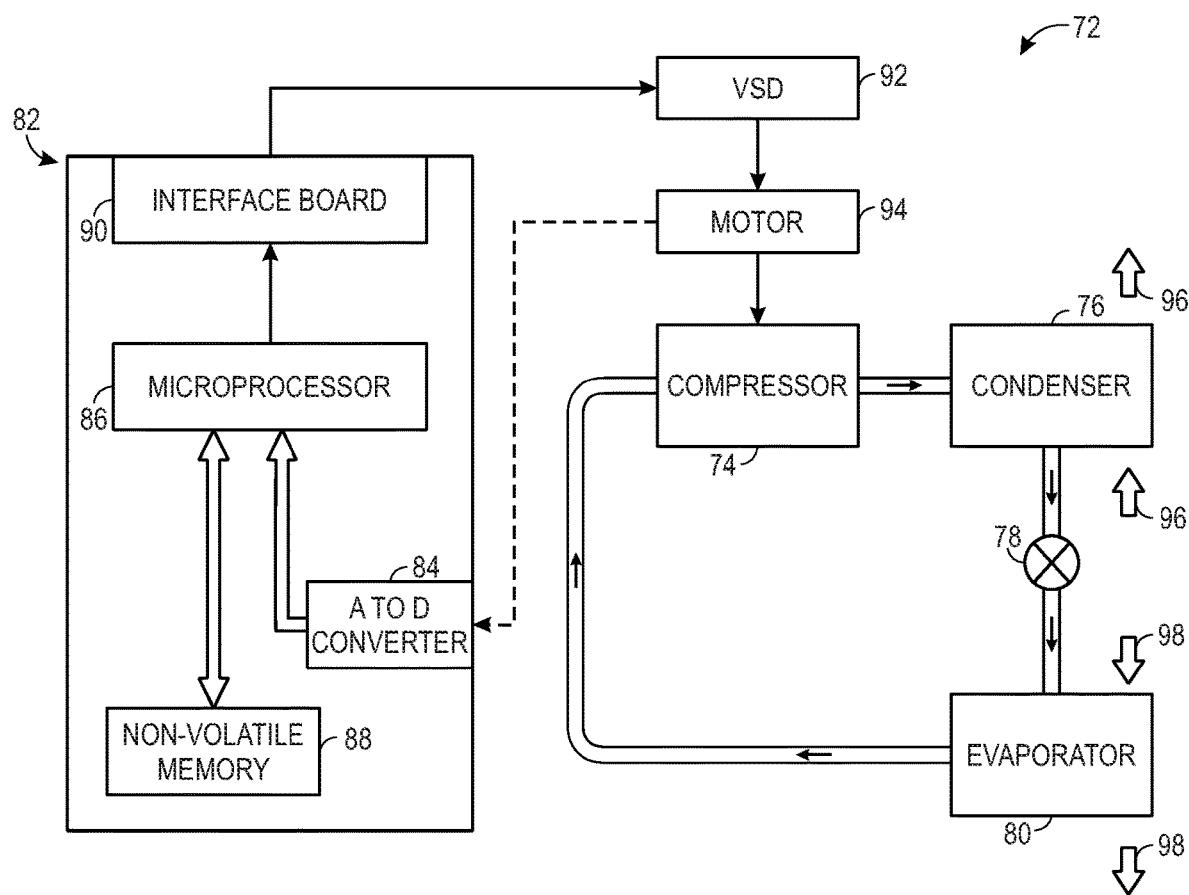
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, an HVAC system 100, such as the HVAC unit 12, the residential heating and cooling system 50, and/or the vapor compression system 72 may be a multi-zone HVAC system. That is, a control system of the HVAC system 100 may be configured to adjust operational parameters and/or properties of the HVAC system 100 to individually control the climate conditions in different zones, or areas, of a building. For example, the HVAC system 100 may respectively control the amount, direction, and/or temperature of a respective air flow provided to each zone of the HVAC system 100. In some embodiments, one or more zones may include a thermostat or other control device configured to provide user control of the HVAC system 100. Particularly, in certain embodiments, the HVAC system 100 may provide user control of respective climate characteristics in each of the zones via a single zone management screen of a user interface of the thermostat, or other user device, as discussed herein.

Figure 5:
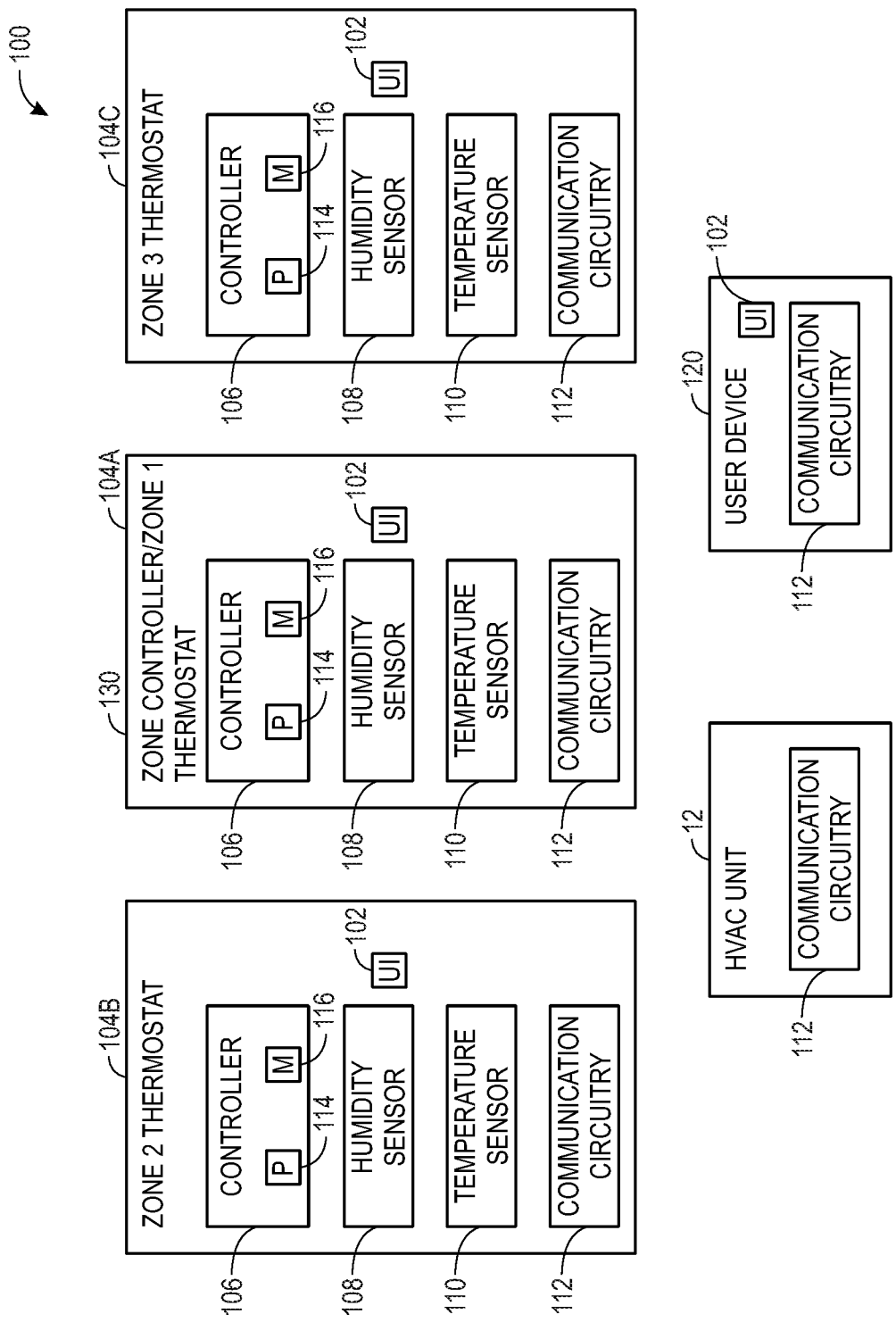
FIG. 5 is a block diagram of an embodiment of an HVAC system, in accordance with aspects of the present disclosure.

With the foregoing in mind, FIG. 5 is a block diagram of an embodiment of the HVAC system 100, which may receive control instructions for multiple zones of the HVAC system 100 from a zone management screen of a user interface 102, or display. As used herein, the term, "screen" may be defined as an electronically created display of information or images, which may be portrayed via an interface, may be a projection onto a surface, may be a hologram, may be 2-dimensional, may be 3-dimensional, or may be any other suitable form that portrays/communicates a particular set of information/images. As mentioned above, the HVAC system 100 be configured to provide individualized air flows to respective zones of the HVAC system 100 to control separate climate characteristics of the zones. In some embodiments, one or more zones of the HVAC system 100 may be associated with a respective thermostat 104, each of which may include a respective user interface 102. Particularly, as discussed herein, each thermostat 104 may be associated with a zone in which the thermostat 104 is located. To this end, when a zone of the thermostat 104 and/or the user interface 102 is referenced herein, the referenced zone is the zone in which the thermostat 104 and/or the user interface 102 is located. Each thermostat 104 may further include a controller 106, a humidity sensor 108, a temperature sensor 110, and communication circuitry 112.

The controller 106 may employ a processor 114, which may represent one or more processors, such as an application-specific processor. The controller 106 may also include a memory device 116 for storing instructions executable by the processor 114 to perform the methods and control actions described herein for the HVAC system 100. The processor 114 may include one or more processing devices, and the memory 116 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 114 or by any general purpose or special purpose computer or other machine with a processor.

Further, the humidity sensor 108 may be any suitable sensor configured to measure or detect a humidity level or parameter of the zone in which the humidity sensor 108 is located. Similarly, the temperature sensors 110 may be any suitable sensor configured to measure or detect a temperature of the zone in which the temperature sensor 110 is located. The thermostats 104 are configured to communicate data, which may include control instructions, measured temperatures, measured humidity levels, any other suitable information, or a combination thereof, between the thermostats 104 and other components of the HVAC system 100, such as the HVAC unit 12, via the communication circuitry 112.

Indeed, the thermostats 104 and the HVAC unit 12 may each include the communication circuitry 112 to enable intercommunication between each of the thermostats 104 and the HVAC unit 12. In some embodiments, the communication circuitry 112 may communicate through a wireless network, such as wireless local area networks [WLAN], wireless wide area networks [WWAN], near field communication [NFC], Wi-Fi, and/or Bluetooth. In some embodiments, the communication circuitry 112 may communicate through a wired network such as local area networks [LAN], or wide area networks [WAN]. Moreover, in certain embodiments, the thermostats 104 and the HVAC unit 12 may similarly communicate with the communication circuitry 112 of a user device 120. Indeed, as discussed herein, the user device 120 may also include the user interface 102, which may provide control of the HVAC system 100 to a user, in accordance with the techniques discussed herein.

As mentioned above, in certain embodiments, the HVAC system 100 may include multiple zones, each of which may include one of the thermostats 104. For example, in the current embodiment, the HVAC system 100 includes at least three zones. That is, a first thermostat 104a may be located in, and configured to control climate characteristics of, a first zone of the HVAC system 100. Similarly, a second thermostat 104b may be located in, and configured to control climate characteristics of, a second zone of the HVAC system 100. Further, a third thermostat 104c may be located in, and configured to control climate characteristics of, a third zone of the HVAC system 100. However, it is to be understood that the HVAC system 100 may include any suitable number of zones, such as eight zones, for example, each of which may be associated with a respective thermostat 104.

In some embodiments, the HVAC system 100 may include a zone controller 130, which, in some embodiments, may be integrated with one of the thermostats 104, as shown. The zone controller 130 may be configured to receive data indicative of climate characteristics, such as temperature measurements, humidity level measurements, and user preferences, from the each of the thermostats 104 of the HVAC system 100. Based on the received data, the zone controller 130 may send data to the HVAC unit 12 and ancillary devices, such as vents and fans, to control the operating parameters, such as the direction, amount, and/or temperature of conditioned air flow, for the respective zones of the thermostats 104. Indeed, in some embodiments, the user interface 102 of the zone controller 130 may provide options for a user to control climate characteristics for each of the zones of the HVAC system 100 through the zone controller 130. However, as discussed herein, in some embodiments, each of the thermostats 104 of the HVAC system 100 may be configured to communicate with each of the other thermostats 104, and may operate to control climate characteristics for each of the zones. In other words, each thermostat 104 of the HVAC system 100 may be configured to function as the zone controller 130. Indeed, in some embodiments, any one of the thermostats 104 may communicate with the HVAC unit 12 to control the climate characteristics of any one of the zones, including the zone in which the particular thermostat 104 is located. Accordingly, as discussed in further detail with reference to FIGS. 8 and 9, the respective user interface 102 of each thermostat 104 and the user device 120 may be configured to display a zone management screen, which may provide options for a user to control the respective climate characteristics for each of the zones of the HVAC system 100.

Figure 6:
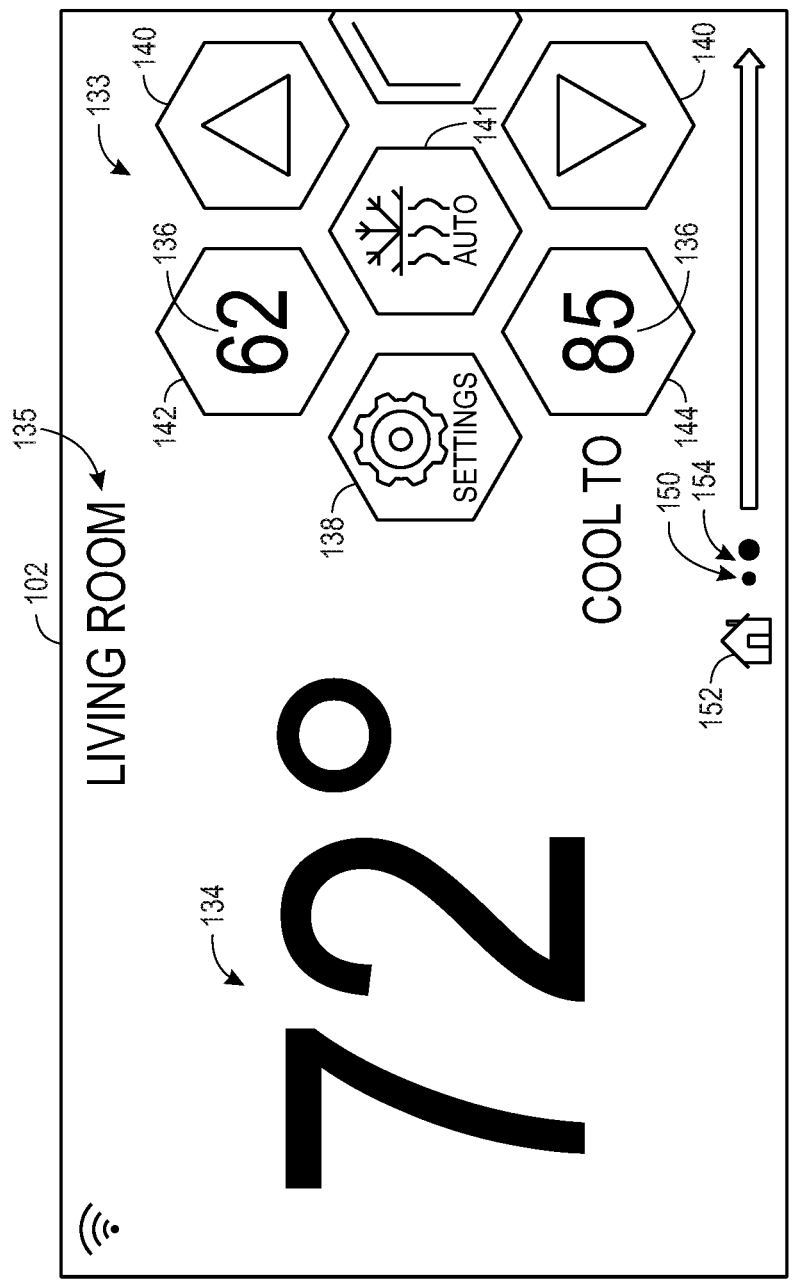
FIG. 6 is a screenshot of an embodiment of a zone home screen of a user interface of an HVAC system, in accordance with aspects of the present disclosure.

Keeping this in mind, FIG. 6 is a screenshot of an embodiment of a zone home screen 132 that may be displayed on the user interface 102 of the thermostat 104 and/or the user device 120. The zone home screen 132 may be an introductory visual displayed on the user interface 102 through which a user may access particular functions of the user interface 102. In the current embodiment, the user interface 102 is associated with the thermostat 104 located in a zone associated with a zone label 135 "LIVING ROOM," as shown. Accordingly, the home screen 132 may present functionality options and climate characteristics associated with a zone corresponding to the living room of a building. However, it is to be understood that the home screen 132 may be different for different thermostats 104, and the text or image of the zone label 135 may depend on the zone of the thermostat 104. For example, the home screen 132 may display functionality options and climate characteristics associated with zones labeled as hallway, office, basement, upstairs, downstairs, bathroom, game room, laboratory, banquet hall, lounge, zone 1, zone 2, zone 3, and so forth, depending on the location of the user interface 102 having the home screen 132.

The user interface 102 may be a touch screen display, which may include one or more selectable representations 133, or icons, that a user may physically touch, press, or swipe to select or otherwise actuate. In other words, the user interface 102 may be configured to provide inputs to the controller 106 based on selections, such as selections of the representations 133, received through user interface 102. In some embodiments, the selectable representations 133 may be selected without screen contact, such as via hand movement detection or physical buttons. In the present embodiment, the selectable representations 133 of the home screen 132 are associated with a measured temperature 134 of the zone, the zone label 135, one or more temperature set points 136, a settings option 138, set point adjusters 140, and a mode, or mode indicator, 141. However, in some embodiments, the measured temperature 134 may not be selectable and may simply display the measured temperature of the zone associated with the user interface 102. In some embodiments, the selectable representations 133 may be associated with other data, features, functions, settings, or other information related to operation of the HVAC system 100.

In some embodiments, the temperature set points 136 may include a heating set point 142 and a cooling set point 144. A user may select either the heating set point 142 or the cooling set point 144 with the user interface 102 and may adjust the selected temperature set point 136 utilizing the set point adjusters 140. For example, a user may select the heating set point 142 by touching or tapping the selectable representation 133 associated with the heating set point 142. Upon selection of the heating set point 142, the set point adjusters 140 may visually indicate, such as by glowing, or emitting a light, that the set point adjusters 140 is configured to receive input to adjust the temperature value of the heating set point 142. Similarly, upon selection of the cooling set point 144, the set point adjusters 140 may visually indicate, such as by glowing, or emitting a light, that the set point adjusters 140 is configured to receive input to adjust the temperature value of the cooling set point 144. In certain embodiments, selection of the heating set point 142 may cause the selectable representations 133 associated with the heating set point 142, such as the heating set point 142 and the set point adjusters 140, to emit a red color or hue, thereby indicating that the set point adjusters 140 are currently configured to adjust the heating set point 142 upon actuation of the set point adjusters 140. Similarly, selection of the cooling set point 144 may cause the selectable representations 133 associated with the cooling set point 144, such as the cooling set point 144 and the set point adjusters 140, to emit a blue color or hue, thereby indicating that the set point adjusters 140 are currently configured to adjust the cooling set point 144 upon actuation of the set point adjusters 140.

Further, a user may select the settings option 138 to adjust one or more settings of the user interface 102 or of the HVAC system 100. For example, a user may adjust a date/time, security options, backlight options, language settings, viewing modes, temperature formats, such as ° F. or ° C., a cleaning mode, sound preferences, and so forth. The user may also select the mode indicator 141, which may adjust the operational mode of the HVAC system 100. For example, a user may select the mode indicator 141 to toggle between an off mode, a heating mode, a cooling mode, an auto mode, and/or any other suitable mode of operation. For example, in the off mode, the HVAC system 100 may not supply heated or cooled air to the zone. In the heating mode, the HVAC system 100 may provide heated air to the zone to cause the measured temperature 134 to approach and/or reach the heating set point 142 temperature. In the cooling mode, the HVAC system 100 may provide cooled air to the zone to cause the measured temperature 134 to approach and/or reach the cooling set point 144 temperature. In the auto mode, the HVAC system 100 may automatically switch between the heating mode and the cooling mode to cause the measured temperature 134 to approach and/or reach an auto set point temperature. In some embodiments, while in auto mode, the HVAC system may automatically switch between the cooling mode and the heating mode to keep the measure temperature 134 between the cooling set point 144 temperature and the heating set point 142 temperature.

The user interface 102 may generally be configured to switch between multiple screens. For example, the user interface 102 may be configured to navigate, toggle, swipe, or scroll between different screens in response to user input. Specifically, a user may swipe the current screen to cause the user interface 102 to navigate to another screen, which may display different information than the information shown on the current screen. To this end, the user interface 102 may include a screen indicator 150, which indicates that the user interface 102 includes multiple available screens to which the user may navigate. The screen indicator 150 may further indicate the position of the current screen relative to the other available screens. To illustrate, in the current embodiment, a home icon 152 or selectable home screen area, of the screen indicator 150 may be bolded, or highlighted, to indicate that the current screen displayed on the user interface 102 is the zone home screen 132. The screen indicator 150 may also include secondary icons 154, which indicate that the user has the option to navigate away from the home screen 132 to secondary screens.

Figure 7:
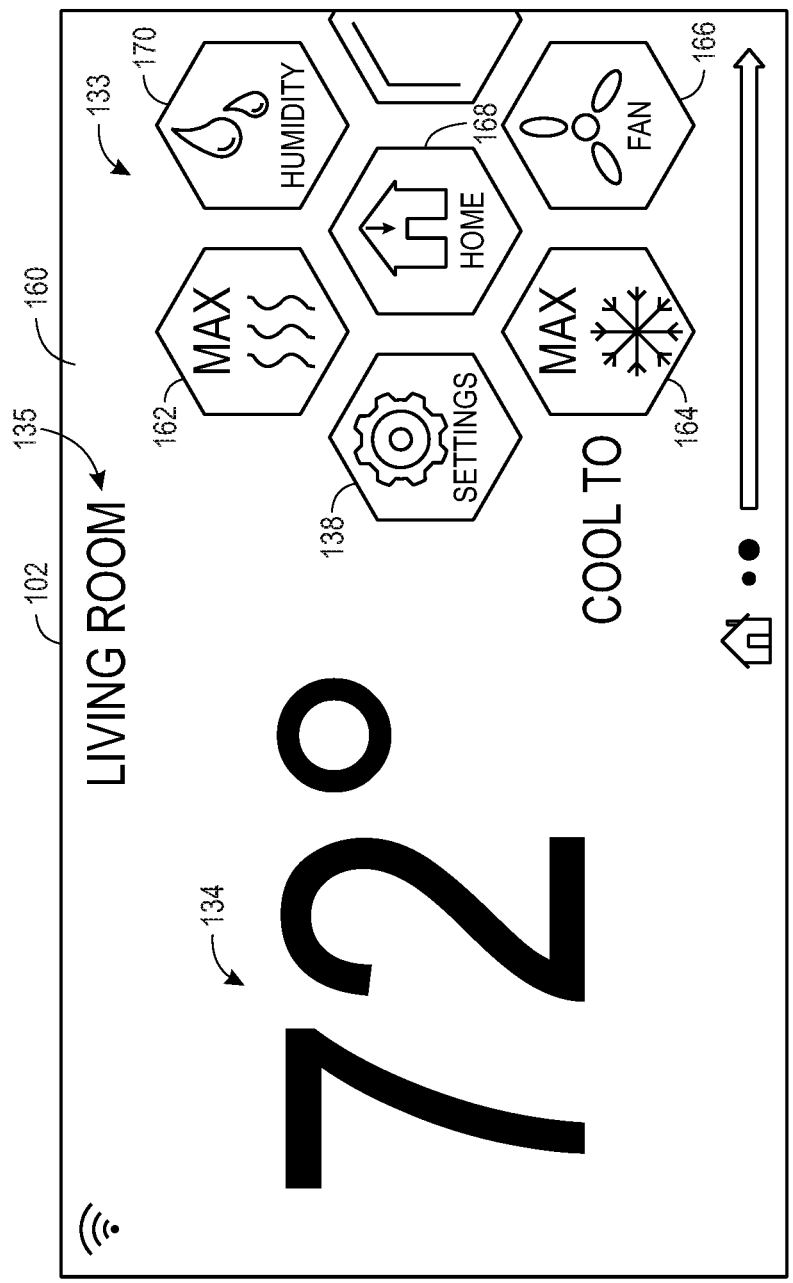
FIG. 7 is a screenshot of an embodiment of a zone options screen of a user interface of an HVAC system, in accordance with aspects of the present disclosure.

For example, as shown in FIG. 7, a user may navigate to a zone options screen 160 or zone home screen, which may include another set of the selectable representations 133 related to options associated with the zone of the user interface 102. For example, on the zone options screen 160, the selectable representations 133 may include the settings option 138, heating options 162, cooling options 164, fan options 166, preset options 168 or preset indicator, and humidity options 170. As will be appreciated, the selectable representations 133 of the zone options screen 160 may be associated with any suitable options or settings that a user may view, adjust, and/or configure via the user interface 102.

The selectable representation 133 associated with the heating options 162 may be selected to adjust various parameters related to the HVAC system 100 while in a heating mode, such as air flow rate and temperature. The selectable representation 133 associated with the cooling options 164 may be selected to adjust various parameters related to the HVAC system 100 while in a cooling mode, such as air flow rate and temperature. The selectable representation 133 associated with the fan options 166 may be selected to adjust various parameters related to a fan of the HVAC system 100, such as fan speed and a fan schedule. The selectable representation 133 associated with the preset options 168 may be selected to adjust/view operating presets. For example, a user may set a variety of preset selections or values for different operations or modes of the HVAC system 100, such as a home preset configuration, an away preset configuration, a party preset configuration, a nighttime preset configuration, a daytime preset configuration, a sleeping preset configuration, other operational present configurations, and so forth. Each operating preset configuration may be associated with operating parameter values, or information, such as a desired temperature set point 136, a fan speed, a humidity level, and so forth. The user may toggle between the operating preset configurations via selection of the selectable representation 133 of the preset options 168. Similarly, the humidity options 170 may be selected to view/adjust a humidity level of the zone.

Figure 8:
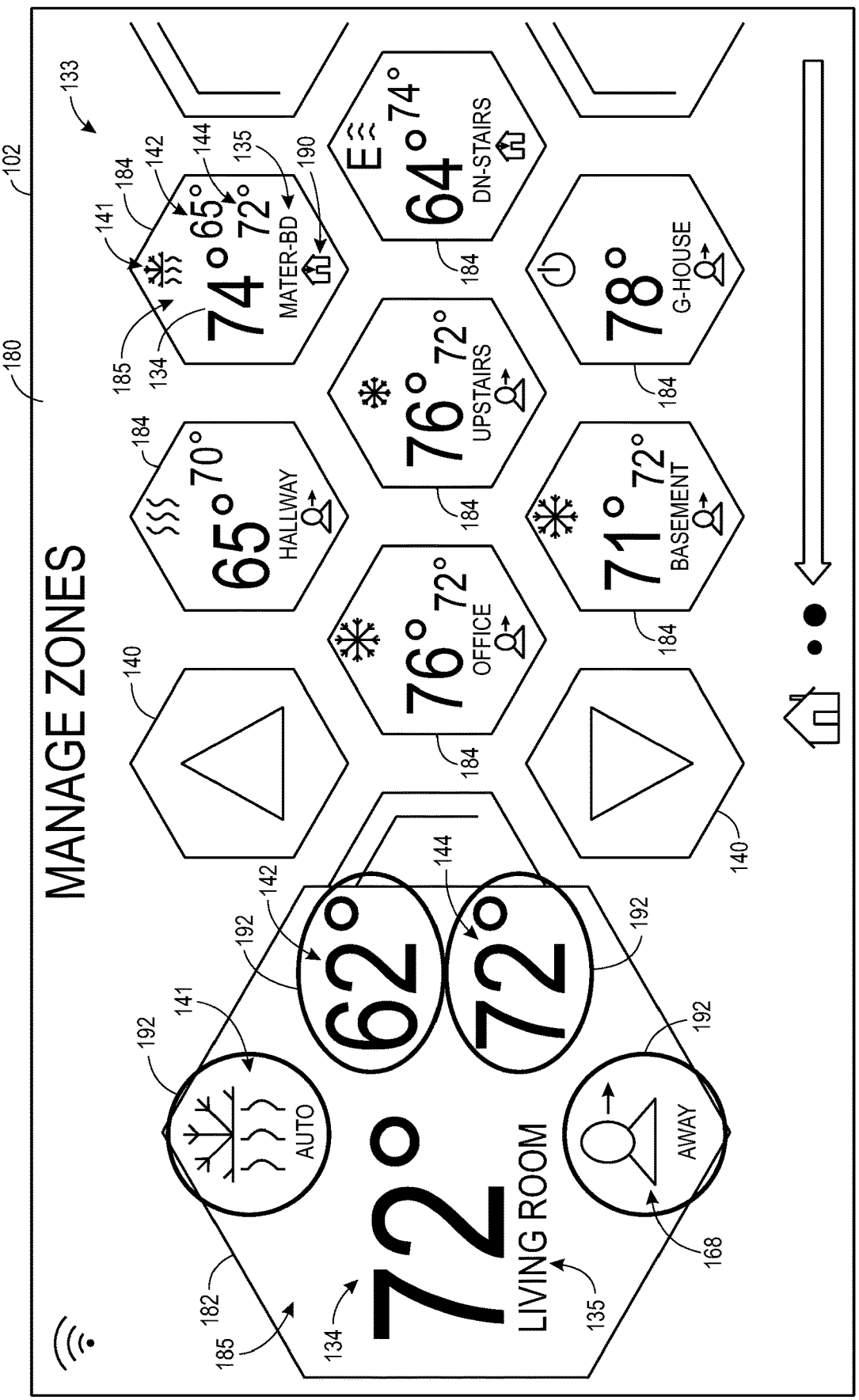
FIG. 8 is a screenshot of an embodiment of a zone management screen of a user interface of an HVAC system, in accordance with aspects of the present disclosure.

Further, as shown in FIG. 8, a user may navigate to a zone management screen 180 that may be displayed not the user interface 102. For example, the zone management screen 180 may be accessed by tapping or swiping the user interface 102 in a particular manner while viewing the zone options screen 160. The zone management screen 180 may include selectable representations 133 relating to each zone of the HVAC system 100. For example, in the current embodiment, the HVAC system 100 includes eight zones, as shown. However, it is to be understood that the HVAC system 100 and the zone management screen 180 may include any suitable number of zones and corresponding selectable representations 133.

The selectable representations 133 of the zone management screen 180 may include an adjustable representation 182, and multiple zone representations 184. The adjustable representation 182 and each zone representation 184 may include a summary of operating information 185 regarding the respective zone represented by the adjustable representation 182 or zone representation 184. For example, operating information 185 for each zone representation 184 may include the zone label 135, the measured temperature 134, the heating set point 142, the cooling set point 144, the preset indicator 168, the mode indicator 141, other suitable information, or a combination thereof. In this way, operating information 185 for each zone serviced by the HVAC system 100 is displayed and viewable on a single screen via the user interface 102.

Further, the adjustable representation 182 may include one or more selectable areas 192 configured to receive input, such as pressure or a touch, from a user, to enable adjustment or modification of settings or parameters associated with the zone represented by the adjustable representation 182. For example, the mode indicator 141, the heating set point 142, the cooling set point 144, and the preset options 168 of a zone may each be associated with one of the selectable areas 192 of the adjustable representation 182, as shown.

Selection of the selectable area 192 disposed about the heating set point 142 or the cooling set point 144 enables the set point adjusters 140 to control the values of either the heating set point 142 or the cooling set point 144, respectively. For example, a user may select the selectable area 192 disposed about the heating set point 142, which may cause the set point adjusters 140 to glow a red color or hue and allow the set point adjusters 140 to adjust the value of the heating set point 142. That is, once the selectable area 192 of the heating set point 142 for the adjustable representation 182 is selected, the user may then use the up/down arrows of the set point adjusters 140 to adjust the value of the heating set point 142. Adjustment to the cooling set point 144 may operate similarly through selection of the selectable area 192 of the cooling set point 144 for the adjustable representation 182 and utilizing the set point adjusters 140.

Further, the user may select the selectable area 192 associated with the mode indicator 141 to toggle through the different available modes for the zone represented by the adjustable representation 182, such as auto mode, heating mode, cooling mode, and off mode. That is, each separate selection or actuation of the selectable area 192 associated with the mode indicator 141 may cause the mode of the HVAC system 100 to change. In this way, the user may adjust the mode of the zone represented by the adjustable representation 182. Similarly, the user may select the selectable area 192 associated with the preset indicator 168 to toggle through different operating preset configurations for the zone.

Moreover, as discussed herein, operational parameters of each zone of the HVAC system 100 may be adjusted from the zone management screen 180. Indeed, climate characteristics for a particular zone may be adjusted via the selectable areas 192 of the adjustment representation 182, as discussed above. Accordingly, the particular zone represented by the adjustable representation 182 may be adjusted or changes. For example, the particular zone represented by the adjustable representation 182 may be changed to any one of the zones represented by the zone representations 184. For example, a user may select one of the zone representations 184 on the user interface 102. Upon selection of one of the zone representations 184, operating information 185 of the zone associated with the selected zone representation 184 may populate the adjustment representation 182. At the same time, the operating information 185 for the zone represented by the adjustable representation 182 prior to the selection of one of the zone representations 184 may switch places with the operating information 185 of the selected zone representation 184. In other words, the operating information 185 for the zone represented by the adjustable representation 182 may then be displayed as one of the zone representations 184 after a different zone is selected for the adjustable representation 182.

For example, in the illustrated embodiment, a user may select the zone representation 184 associated with the zone label 135, "Office." Upon selection of the "Office" zone representation 184, the operating information 185 related to the "Office" zone may populate the adjustable representation 182, and the operating information 185 related to the "Living Room" zone may populate the selected zone representation 184 that had previously been populated by the operating information 185 related to the "Office" zone. In other words, upon selection of one of the zone representations 184, the operating information 185 of the selected zone representation 184 may switch places on the zone management screen 180 with the operating information 185 of the zone currently represented by the adjustable representation 182.

Once the user has selected one of the zone representations 184 to populate the adjustable representation 182 with respective operating information 185 of the selected zone, the user may adjust the operating information 185 that had been associated with the selected zone representation 184, such as by utilizing the selectable areas 192 and the set point adjusters 140, as discussed above. In some embodiments, the switching of operating information 185 between the selected zone representation 184 and the adjustable representation 182 may be accompanied by an animation, such as movement of the operating information 185 for the selected zone across the zone management screen 180 between the selected zone representation 184 and the adjustment representation 182. However, it is to be understood that any suitable transitional animation or display may be used to signify that the respective operating information 185 of the selected zone and the previously-adjustable zone are switching places on the zone management screen 180. For example, in some embodiments, the location of the selectable representations 133 on the zone management screen 180 may be dynamic. For example, upon selection of one of the zone representations 184, the selected zone representation 184 may increase in size on the user interface 102 and may be automatically altered to include the selectable areas 192 of the adjustable representation 182, as discussed above. In other words, upon selection of the zone representation 184, the zone representation 184 may be visually adjusted to include the size and functionality of the adjustment representation 182 on the user interface 102. Further, in some embodiments, selection of one of the zone representations 184 may cause unselected zone representations 184 to decrease in size on the user interface 102. In some embodiments, upon navigation to the zone management screen 180, the zone management screen 180 may only include the zone representations 184. Upon selection of one of the zone representations 184, the selected zone representation 184 may increase in size on the user interface 102 to become the adjustment representation 182, and the unselected zone representations 184 may remain a constant size, or may decrease in size, on the user interface 102.

Moreover, in some embodiments, the adjustable representation 182 may be selected to navigate the user interface 102 to the zone options screen 160 (FIG. 6) for the zone associated with the adjustable representation 182. For example, a user may select an area of the adjustable representation 182 that is outside of the selectable areas 192, such as proximate to the measured temperature 134 or the zone label 135, to navigate to the zone options screen 160.

Figure 9:
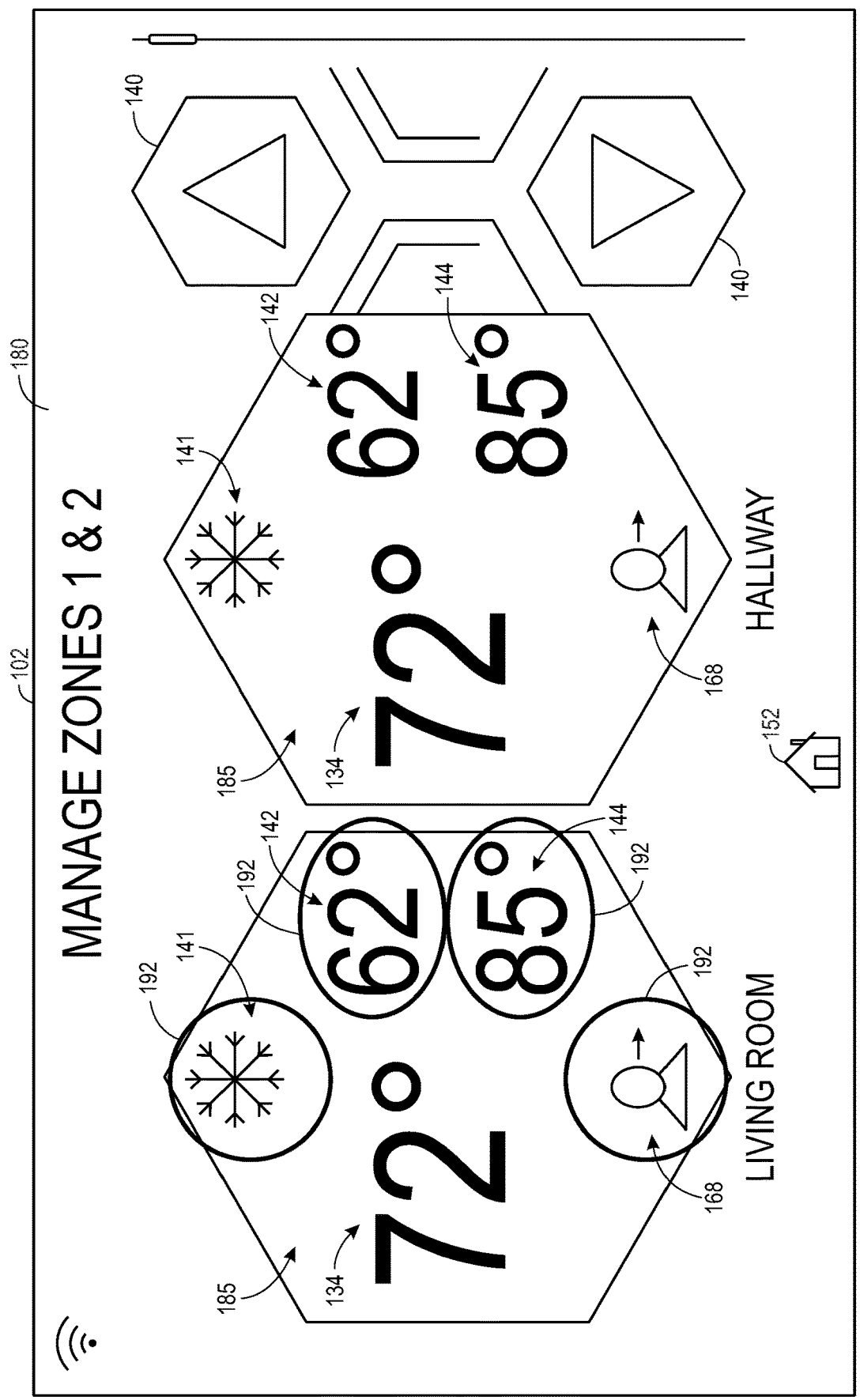
FIG. 9 is a screenshot of an embodiment of a zone management screen of a user interface of an HVAC system, in accordance with aspects of the present disclosure.

Further, in some embodiments, as shown in FIG. 9, the zone management screen 180 may include multiple selectable representations 133 of different zones, each including respective operating information for the zones. As shown, the selectable representations 133 of the zones may be self-similar, or have similar configurations, such as having similar information and/or having similar visuals. Specifically, each selectable representation 133 may include the zone label 135, the measured temperature 134, the heating set point 142, the cooling set point 144, the preset options 168, the mode 141, or a combination thereof. To adjust the operating information 185, such as the heating set point 142, the cooling set point 144, the operating preset 168, or the mode 141 for a zone, the user may select the selectable representation 133 corresponding to the zone for which an operating adjustment is desired. Once, the selectable representation 133 is selected, the selected selectable representation 133 may include the selectable areas 192. For example, as shown, the selectable representation 133 associated with the zone, "LIVING ROOM," has been selected and includes selectable areas 192, similar to the adjustable representation 182 discussed above with reference to FIG. 8. In other words, once one of the selectable representations 133 of the zone management screen 180 is selected, the selectable representation 133 may include the functionality of the adjustable representation 182 discussed above. Moreover, as shown, while the operating information 185 of a particular zone is selected/adjusted, the zone management screen 180 may continuously and/or continually display the selectable representation 133 of other zones, which includes the respective zone operating information 185 of the other zones. Indeed, the operating information 185 for multiple zones may be continuously and/or continually displayed on the zone management screen 180 whether or not the zone operating information 185 is being adjusted/selected. As a result, operating information 185 of multiple zones may be viewed and adjusted from a single screen or display on the user interface 102.

Further, it should be noted that while the zone management screen 180 displayed in FIG. 9 displays the selectable representations 133 and operating information 185 for only two zones, the zone management screen 180 may include any suitable number of selectable representations 133 with respective operating information 185 for different zones. Moreover, as shown, in some embodiments, the zone management screen 180 may include the home icon 152. In some embodiments, selection of the home icon 152 may navigate the user interface 102 to the zone options screen 160 (FIG. 6) for a particular or selected zone.

Accordingly, the present disclosure is directed to a system for providing a zone management screen configured to provide control of operating parameters of multiple zones. In other words, the zone management screen disclosed herein enables a user to view and adjust operating parameters for multiple zones from a single display screen provided on a user interface. For example, a user may adjust a heating set point, a cooling set point, an operating mode, an operating preset, or a combination thereof, for multiple zones from the single zone management screen. In this way, the user may efficiently adjust the operating parameters for multiple or all zones of an HVAC system without navigating through multiple sub-menus or secondary screens. Accordingly, the disclosed zone management screen is configured to simplify the management of multiple zones of an HVAC system.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A control system for a heating, ventilation, and/or air conditioning (HVAC) system, comprising:
 a user interface configured to display a zone management screen having a first selectable representation of a first zone of the HVAC system including a first temperature set point and a first operating mode of the first zone, the zone management screen having an adjustable representation, and the zone management screen having a second selectable representation of a second zone of the HVAC system, the second selectable representation having a second temperature set point and a second operating mode of the second zone, wherein the adjustable representation is different from the first selectable representation and the second selectable representation; and
 a controller configured to:
  receive a user input via the zone management screen of a selection of the first selectable representation or the second selectable representation;
  populate the adjustable representation with operating information of the first zone or the second zone based on the selection;
  receive a first input via the zone management screen to adjust the first temperature set point of the first zone or to adjust the second temperature set point of the second zone; and
  receive a second input via the zone management screen to adjust the first operating mode of the first zone or to adjust the second operating mode of the second zone.

2. The control system of claim 1, wherein the first selectable representation of the first zone and the second selectable representation of the second zone are both continually displayed on the zone management screen.

3. The control system of claim 1, wherein the user interface is configured to display each screen of a plurality of screens, and wherein the plurality of screens includes the zone management screen.

4. The control system of claim 1, wherein the zone management screen includes a set point adjuster, and wherein the controller is configured to receive the first input via user actuation of the set point adjuster of the zone management screen.

5. The control system of claim 4, wherein the first temperature set point includes an adjustable heating temperature set point and an adjustable cooling temperature set point, and wherein the controller is configured to:
receive a first adjustment of the adjustable heating temperature set point;
adjust a color of the set point adjuster on the zone management screen to a first hue based on the first adjustment;
receive a second adjustment of the adjustable cooling temperature set point; and
adjust the color of the set point adjuster on the zone management screen to a second hue based on the second adjustment.

6. The control system of claim 1, wherein the first selectable representation includes a first operational preset configuration of the first zone, wherein the second selectable representation includes a second operational preset configuration of the second zone, and wherein the controller is configured to receive a third input via the zone management screen to adjust the first operational preset configuration of the first zone or to adjust the second operational preset configuration of the second zone.

7. The control system of claim 1, wherein the first selectable representation includes a selectable home screen area, and wherein the controller is configured to receive a third input via the selectable home screen area of the zone management screen to navigate to a zone home screen of the first zone.

8. The control system of claim 1, wherein the controller is configured to generate the zone management screen for the user interface and for an additional user interface.

9. The control system of claim 1, wherein the controller is configured to adjust respective sizes of the first selectable representation and the second selectable representation on the zone management screen based on a user selection of the first selectable representation or the second selectable representation.

10. The control system of claim 1, wherein:
the zone management screen includes an adjustable representation; and
the controller is configured to:
receive a third input via the zone management screen of a selection of the first selectable representation or the second selectable representation; and
populate the adjustable representation based on the selection.

11. The control system of claim 1, wherein the operating information includes a temperature set point, an operating mode, a label, and a current temperature.

12. A controller for a heating, ventilation, and/or air conditioning (HVAC) system, wherein the controller is configured to:
generate an interface screen for a display, wherein the interface screen includes a first selectable representation of a first zone of the HVAC system, a second selectable representation of a second zone of the HVAC system, an adjustable representation, and a set point adjuster configured to selectively adjust a respective operating parameter set point for a selected one of the first zone or the second zone, wherein the adjustable representation, the first selectable representation, and the second selectable representation are continuously displayed on the interface screen;
receive an input via the interface screen indicative of a selection of the first selectable representation or the second selectable representation; and
populate the adjustable representation with operating information of the first zone or the second zone based on the selection;
receive a first set point adjustment input for the first zone via the set point adjuster of the interface screen;
receive a second set point adjustment input for the second zone via the set point adjuster of the interface screen;
receive a first mode adjustment input of a first operating mode for the first zone via a selectable area of the adjustable representation; and
receive a second mode adjustment input of a second operating mode for the second zone via the selectable area of the adjustable representation.

13. The controller of claim 12, wherein the controller is configured to continuously display the first selectable representation and the second selectable representation during receipt of the first set point adjustment input and during receipt of the second set point adjustment input.

14. The controller of claim 12, wherein the controller is configured to receive a user selection of the first zone via the first selectable representation and is configured to receive the first set point adjustment input for the first zone via the set point adjuster of the interface screen when the first zone is selected.

15. The controller of claim 14, wherein the controller is configured to receive a user selection of the second zone via the second selectable representation and is configured to receive the second set point adjustment input for the second zone via the set point adjuster of the interface screen when the second zone is selected.

16. The controller of claim 12, wherein the first selectable representation and the second selectable representation have similar configurations.

17. The controller of claim 12, wherein the first selectable representation of the first zone includes a name of the first zone, a measured temperature of the first zone, an operating mode of the first zone, an operating parameter set point of the first zone, or any combination thereof.

18. The controller of claim 17, wherein the operating parameter set point is a temperature set point.

19. The controller of claim 17, wherein the operating parameter set point includes a heating temperature set point having a third selectable representation and a cooling temperature set point having a fourth selectable representation, and wherein the set point adjuster is configured to selectively adjust the operating parameter set point for a selected one of the heating temperature set point or the cooling temperature set point.

20. The controller of claim 12, wherein the first selectable representation of the first zone includes an indication of the first operating mode of the first zone and the second selectable representation of the second zone of the HVAC system includes an indication of the second operating mode of the second zone.

21. The controller of claim 12, wherein the controller is configured to generate the interface screen for the display and for an additional display.

22. The controller of claim 12, wherein the first selectable representation of the first zone includes a heating temperature set point, a cooling temperature set point, a zone label, an operating mode, an operating preset, or a combination thereof, for the first zone, and wherein the second selectable representation of the second zone comprises a heating temperature set point, a cooling temperature set point, a zone label, an operating mode, an operating preset, or a combination thereof, for the second zone.

23. A non-transitory computer readable storage medium for a heating, ventilation, and/or air conditioning (HVAC) system comprising instructions that, when executed by a processor, cause the processor to initiate:
 displaying a zone management screen via a user interface, wherein the zone management screen includes a plurality of selectable representations, wherein each selectable representation of the plurality of selectable representations is associated with one of a plurality of zones of the HVAC system, each selectable representation of the plurality of selectable representations includes zone operating information for the one of the plurality of zones, and wherein the plurality of selectable representations of the zone management screen includes an adjustable representation and a plurality of zone representations;
 receiving an input of a first selection of a first zone of the plurality of zones via user selection of a first selectable representation of the plurality of selectable representations of the zone management screen;
 displaying the plurality of selectable representations while receiving an input to adjust a temperature set point of the first zone via a set point adjuster of the zone management screen;
 populating the adjustable representation with operating information of the first zone associated with the first selectable representation;
 receiving an additional input of a second selection of a second zone of the plurality of zones via user selection of a second selectable representation of the plurality of selectable representations; and
 populating the adjustable representation with operating information of the second zone associated with the second selectable representation.

24. The non-transitory computer readable storage medium of claim 23, wherein the non-transitory computer readable storage medium further comprises instructions that, when executed by the processor, cause the processor to initiate:
 displaying the plurality of selectable representations while receiving an input to adjust a temperature set point of the second zone via the set point adjuster of the zone management screen.

25. The non-transitory computer readable storage medium of claim 23, wherein the operating information of the first zone includes the temperature set point, an operating mode of the first zone, a label of the first zone, and a current temperature of the first zone, and wherein the non-transitory computer readable storage medium further comprises instructions that, when executed by the processor, cause the processor to initiate:
 receiving an input of a selection of a first selection area adjacent the temperature set point of the adjustable representation;
 receiving an input of an adjustment to the temperature set point via the set point adjuster;
 receiving an input of a selection of a second selection area adjacent the operating mode of the adjustable representation; and
 adjusting the operating mode of the first zone based on the input of the selection of the second selection area adjacent the operating mode.

26. The non-transitory computer readable storage medium of claim 23, wherein each selectable representation of the plurality of selectable representations includes a cooling temperature set point, a heating temperature set point, a zone label, a measured temperature, an operating mode, a preset operating configuration, or a combination thereof, of the respective zone associated with the selectable representation.

* * * * *